UNITED STATES PATENT OFFICE.

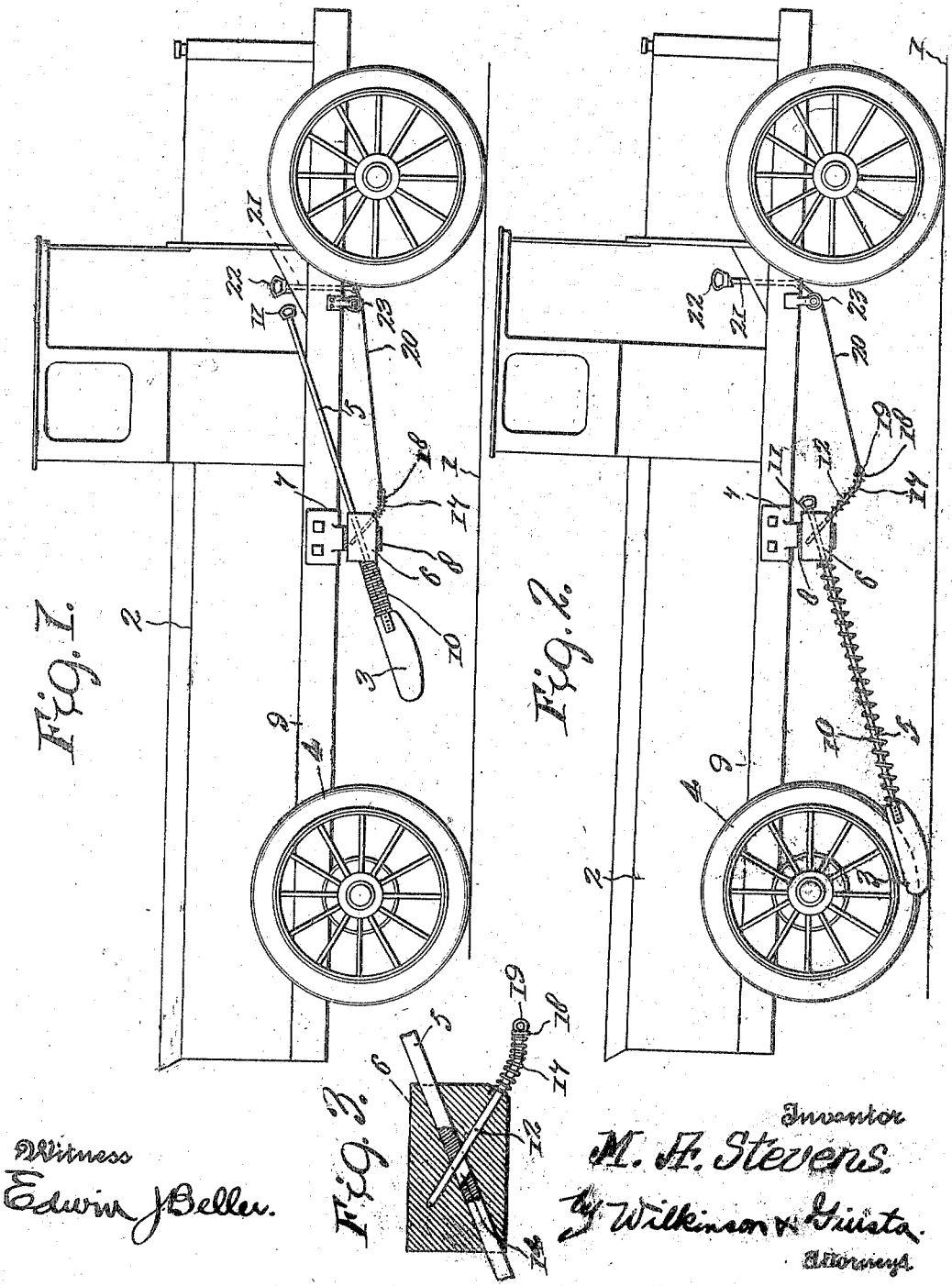

MURRELL A. STEVENS, OF RUTLAND, VERMONT.

EMERGENCY-BRAKE.

1,290,400. Specification of Letters Patent. Patented Jan. 7, 1919.

Application filed July 29, 1918. Serial No. 247,251.

*To all whom it may concern:*

Be it known that I, MURRELL A. STEVENS, a citizen of the United States, residing at Rutland, in the county of Rutland and State of Vermont, have invented certain new and useful Improvements in Emergency-Brakes; and I do hereby declare the following to be a full, clear, and exact description of the invention, such as will enable others skilled in the art to which it appertains to make and use the same.

The present invention relates to improvements in emergency brakes for vehicles, and has for its object to provide an improved emergency brake for use on automobiles and like vehicles wherein a shoe is adapted to be projected beneath the rear wheels of the vehicle so as to elevate the wheels from the ground and cause the vehicle to slide along on the shoes, which will quickly and effectively bring the vehicle to a stop.

The improved emergency brake is intended for use more particularly in hilly country where the liability of the brake lining to burn out is very great, which is a source of many accidents.

It is a further object of the present invention to provide an improved emergency brake of the above character in which simply operated parts are arranged to hold the brake shoes in a retracted position during the normal running of the vehicle; and which parts are adapted to quickly release the shoes so that they may be projected beneath the rear vehicle wheels.

In the accompanying drawings forming a part of this application, and in which similar reference symbols indicate corresponding parts in the several views:

Figure 1 is a side elevational view of a vehicle with the improved emergency brake applied thereto and shown partly in section.

Fig. 2 is a similar view with the brake shoes shown projected in the operative position; and Fig. 3 is a sectional view of a detail.

Referring more particularly to the drawings, 1 designates the ground line or roadway over which the vehicle 2 is traveling to the right. The improved emergency brake shoes 3 are shown in the normal inoperative position in Fig. 1; while in Fig. 2 such shoes 3 appear beneath the rear wheels 4 of the vehicle so as to lift such wheels out of rolling contact with the surface 1. The vehicle is thereby compelled to slide along on the shoes 3, the great frictional contact between same and the roadway 1 causing the vehicle to be quickly brought to a stop.

The shoes may be made of any suitable material, preferably sheet metal and with or without side flanges, they being carried on plunger rods 5 which pass slidably through casings 6 supported at an inclination by hangers 7 having straps 8 which pass about said casings. The hangers 7 are bolted or otherwise secured to the longitudinal channel beams 9 or other suitable parts of the vehicle; it being only necessary that the casings 6 be supported at a low elevation so that the plunger rods 5 and shoes 3 may be projected at a convenient angle beneath the rear wheels 4.

Coil springs 10 are wound about the plunger rods 5 between the shoes 3 and the adjacent ends of the casings 6, and are useful in projecting the shoes 3 beneath the wheels when the plunger rods are released. Handles 11 are carried by the upper ends of the plunger rods 5 in order that such rods after once being projected to the operative position may be afterward retracted to place the shoes 3 in the initial inoperative position. Such shoes are held in the initial inoperative position by means of latch pins 12, the same fitting in sockets 13 made diagonally through the casings 6 and through slots 14 made in the plunger rods 5.

Coil springs 17 encircle the latch pins 12 and have their ends confined between the bottom parts of the casings 6 and flanges 18 which are arranged just to the rear of eyelets 19. Wire or other cables 20 are connected between the eyelets 19 and operating devices 21 which are movable through the footboard or other suitable part of the vehicle in a convenient place to be readily operable by the vehicle driver. In the instance shown the operating devices 21 are vertically movable rods having handles 22 by which they may be drawn vertically upward to exert pulls on the cables 20, the movement of which is eased by passing over rollers 23 near the operating devices 21.

After being withdrawn by means of the operating devices 21 the latch pins 12 are returned to the initial latching position by the coil springs 17, which are pulled to a condition of tension by the retraction of the latch pins.

In use the device is normally as shown in

Fig. 1, where the shoes 3 are held in an elevated position to the front of the rear wheels 4, the coil springs 10 are contracted to a potential condition and the latch pins 12 are projected through the slots 14, where they hold the plunger rods 5 in the position shown.

In case of emergency the vehicle driver may stop the vehicle by pulling upon the handles 22, which will vertically raise the operating devices 21 and pull upon the cables 20 and the latch pins 12, causing the withdrawal of the pins from the slots 14, as shown in Fig. 2. The coil springs 10 are thereby released and operate to project the shoes 3 rearwardly and beneath the rear wheels 4, which will readily run up thereupon. The sliding of the vehicle on the shoes 3 will quickly bring the vehicle to a stop. After the service brake has been repaired the shoes 3 may be withdrawn from their position beneath the wheels 4, which will be aided by reversing the vehicle, and the plunger rods 5 may be pulled forwardly by the handles 11. As soon as the slots 14 in the plunger rods 5 come opposite the latch pins 12 the tension springs 17 will project these pins through the slots 14 and to the positions shown in Fig. 1, whereupon all of the parts will be restored to initial condition in readiness for the next actuation.

It is obvious that those skilled in the art may vary the details of construction and arrangements of parts without departing from the spirit of my invention, and therefore I do not wish to be limited to such features except as may be required by the claims.

I claim:

1. In combination with a vehicle, of an emergency brake therefor including a bracket secured to the vehicle framework, a casing held in said bracket, said casing having diagonally disposed intersecting openings therein, a plunger rod fitted to reciprocate through one of the openings in said casing, a brake shoe carried by the lower rear end of said plunger rod and adapted to be projected beneath the rear wheel of the vehicle, a coil spring wound about said plunger rod between said casing and shoe and adapted to be normally compressed whereby the same may project the shoe when released, a handle carried directly on the other end of said plunger rod for drawing the shoe to the inoperative position, said plunger rod having a slot therein adapted to register with the other diagonal opening in said casing, a latch pin fitted in said other diagonal opening and adapted to pass through the slot in said plunger rod to hold the latter elevated, means whereby said latch may be withdrawn from said slot, and spring means for normally holding said latch in the slot, substantially as described.

2. In combination with a vehicle, a bracket supported by the chassis thereof forward of the rear wheels, a casing held in said bracket, said casing having diagonally disposed intersecting openings therein, a plunger rod fitted to reciprocate in one of the openings in said casing, said plunger rod having a slot therein adapted to be brought into registry with the other diagonal opening, a latch pin fitted in the other diagonal opening and having a reciprocating movement therein, said latch pin adapted to pass through said slot whereby to hold the plunger rod elevated, a coil spring wound about the latch pin for causing the same to enter said slot and to yieldingly hold the pin therein, means operable from the driver's seat in the vehicle for withdrawing said pin from the slot in opposition to said coil spring, a handle on the upper forward end of the plunger rod, a brake shoe on the lower rear end of said plunger rod, and spring means arranged between the shoe and casing for projecting said shoe beneath the rear wheel when the latch pin is withdrawn, substantially as described.

In testimony whereof, I affix my signature.

MURRELL A. STEVENS.